(12) United States Patent
Vergnes et al.

(10) Patent No.: US 8,601,197 B2
(45) Date of Patent: Dec. 3, 2013

(54) MICROCONTROLLER INCLUDING FLEXIBLE CONNECTIONS BETWEEN MODULES

(75) Inventors: Alain Vergnes, Trets (FR); Renaud Tiennot, Aix en Provence (FR); Guillaume Pean, Aix en Provence (FR)

(73) Assignee: Atmel Rousset S.A.S., Rousset Cedez (FR)

(*) Notice: Subject to any disclaimer, the term of this patent is extended or adjusted under 35 U.S.C. 154(b) by 509 days.

(21) Appl. No.: 12/946,699

(22) Filed: Nov. 15, 2010

(65) Prior Publication Data

US 2012/0124261 A1    May 17, 2012

(51) Int. Cl.
*G06F 13/36* (2006.01)
(52) U.S. Cl.
USPC .......................................... 710/308; 713/182
(58) Field of Classification Search
USPC ........................... 710/305–308; 713/182–186
See application file for complete search history.

(56) References Cited

U.S. PATENT DOCUMENTS

| | | | |
|---|---|---|---|
| 7,199,815 B2* | 4/2007 | Aoyama | 348/14.01 |
| 8,184,311 B2* | 5/2012 | Sakai | 358/1.15 |
| 2003/0142818 A1* | 7/2003 | Raghunathan et al. | 380/1 |
| 2004/0139170 A1* | 7/2004 | Shen et al. | 709/218 |
| 2006/0206721 A1 | 9/2006 | Dahamel et al. | |
| 2008/0229079 A1* | 9/2008 | Flynn et al. | 712/220 |

OTHER PUBLICATIONS

Abridged Data Sheet; Maxim; High-Performance, Secure, 32-Bit MIPS Microcontroller Supporting Linux OS; Maxim Integrated Products; Rev. 1; Feb. 2010; 2 pages.

* cited by examiner

*Primary Examiner* — Clifford Knoll
(74) *Attorney, Agent, or Firm* — Fish & Richardson P.C.

(57) ABSTRACT

A microcontroller includes a system bus matrix to connect various modules. The microcontroller also includes direct connections between modules. For example, the microcontroller may include a direct connection between a data processing module and a memory controller module to improve the transfer rate for data that is processed by the data processing module.

18 Claims, 12 Drawing Sheets

MICROCONTROLLER INCLUDING FLEXIBLE CONNECTIONS BETWEEN MODULES

TECHNICAL FIELD

This subject matter is generally related to electronics, and more particularly to microcontroller architectures that include data processing modules.

BACKGROUND

Microcontrollers may include a general purpose processor. Some microcontrollers additionally use specialized data processing modules to perform specific types of data processing. The data processing modules are useful, for example, because they perform data processing faster than the general purpose processor, or because they allow the general purpose processor to continue running applications during data processing. The data processing modules, however, can introduce latency on a system bus if the modules need to transfer large amounts of data.

SUMMARY

A microcontroller includes a system bus matrix to connect various modules. The microcontroller also includes direct connections between modules. For example, the microcontroller may include a direct connection between a data processing module and a memory controller module to improve the transfer rate for data that is processed by the data processing module.

Particular embodiments of the invention can be implemented to realize one or more of the following advantages: (1) the number of system bus matrix accesses in a microcontroller may be reduced when data processing is performed on data being transferred from one module to another module; (2) utilization of a processor may be reduced for transferring data; and/or (3) the number of channels of a Direct Memory Access (DMA) module may be reduced or eliminated.

DETAILED DESCRIPTION

System Overview

Figure 1:
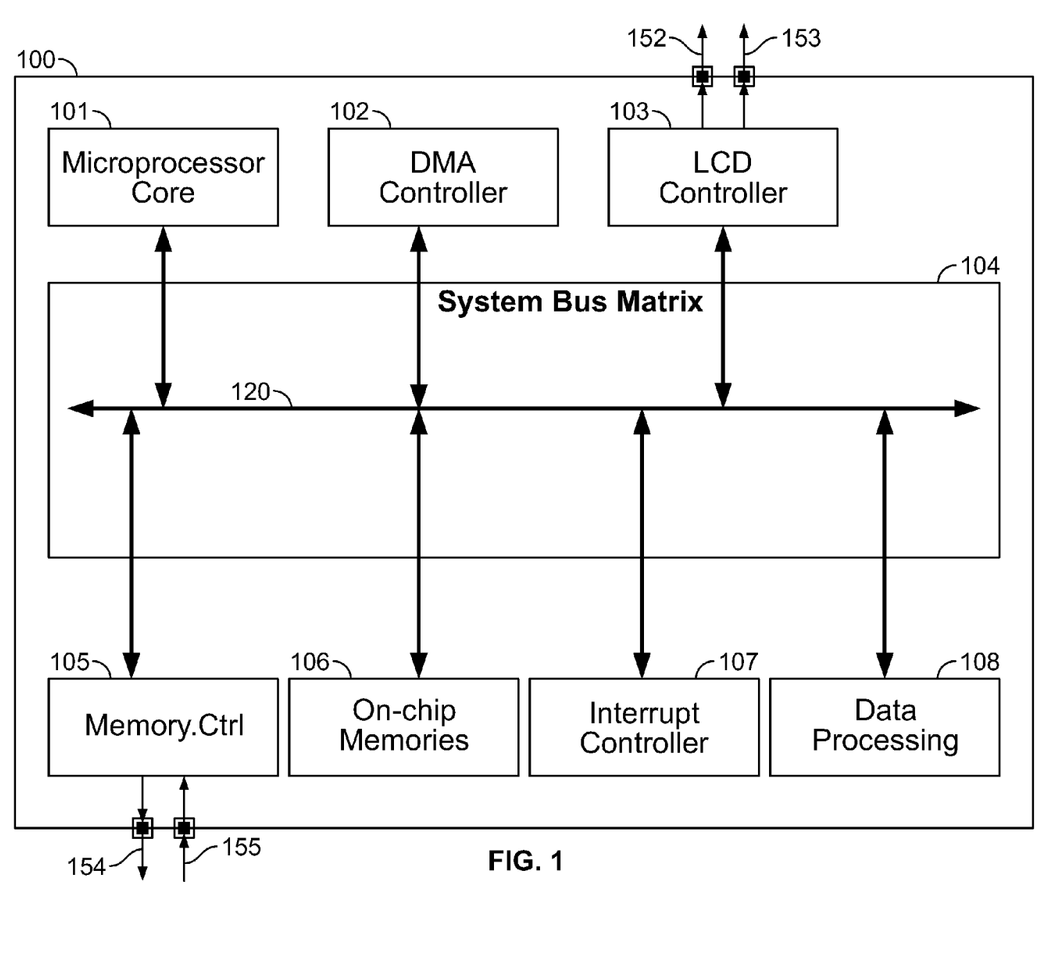
FIG. 1 is a block diagram of an example microcontroller including a microprocessor core and various modules connected through a system bus matrix.

FIG. 1 is a block diagram of an example microcontroller 100 including a microprocessor core 101 and various modules 102, 103, 104, 105, 106, 107 and 108 connected through a system bus matrix 104.

The modules can be configured to act as master modules on the system bus matrix 104 or as slave modules. Master modules can initiate data transfers with the slave modules on the system bus matrix 104. For the example microcontroller 100, a microprocessor core 101, a standalone direct memory access (DMA) controller 102, and a liquid crystal display (LCD) controller 103 are configured as master modules. A memory controller 105, on-chip memories 106, an interrupt controller 107, and a data processing module 108 are configured as slave modules.

The microcontroller 100 can communicate with external components through some of the modules. For example, the microcontroller 100 can communicate with an LCD screen using the LCD controller 103, and the microcontroller 100 can communicate with a memory device using the memory controller 105. Those modules may include terminal contact pads 152, 153, 154, and 155 that physically connect external components.

The microprocessor core 101 is configured to execute code that includes executable instructions. The code is stored, for example, in the on-chip memories 106 or in an external memory accessed using the memory controller 105. In some implementations, the external memory is larger than the on-chip memory 106. For example, the external memory may be a frame buffer storing image data to be displayed on an LCD screen.

The standalone DMA controller 102 is configured to perform data transfers. For example, the standalone DMA controller 102 can perform a data transfer between a memory (the on-chip memories 106 or an external memory via the memory controller 105) and the data processing module 108. The standalone DMA controller 102 may perform repetitive transfers so that the microprocessor 101 is free to execute code.

Consider an example data transfer of an image stored in an external memory under control of the memory controller 105 to the LCD controller 103. Moreover consider this image has to be processed by data processing module 108 after being read out of external memory and prior to be displayed. The standalone DMA controller 102 performs the transfer by first initiating a read access to the memory controller 105 to get the first block of data. The standalone DMA controller 102 stores the first block of data (e.g., in a queue that may include one or more registers), and when the read access is complete, initiates a write access to the data processing module 108. Once the data processing module 108 has completed the processing of the first block of data, it triggers the LCD module 103 which initiates a write access (using an embedded DMA controller) to the data processing module 108. The standalone DMA controller 102 and embedded DMA of LCD module 103 then repeats those steps.

Throughout this specification, reference is made to the LCD controller 103; however, various other modules can take the place of the LCD controller 103. For example, the LCD controller 103 may be replaced with a generic display device controller, a different type of data processing module, a network communication module, a data storage device module, or various other modules suitable for various applications.

System Bus Matrix

Figure 2:
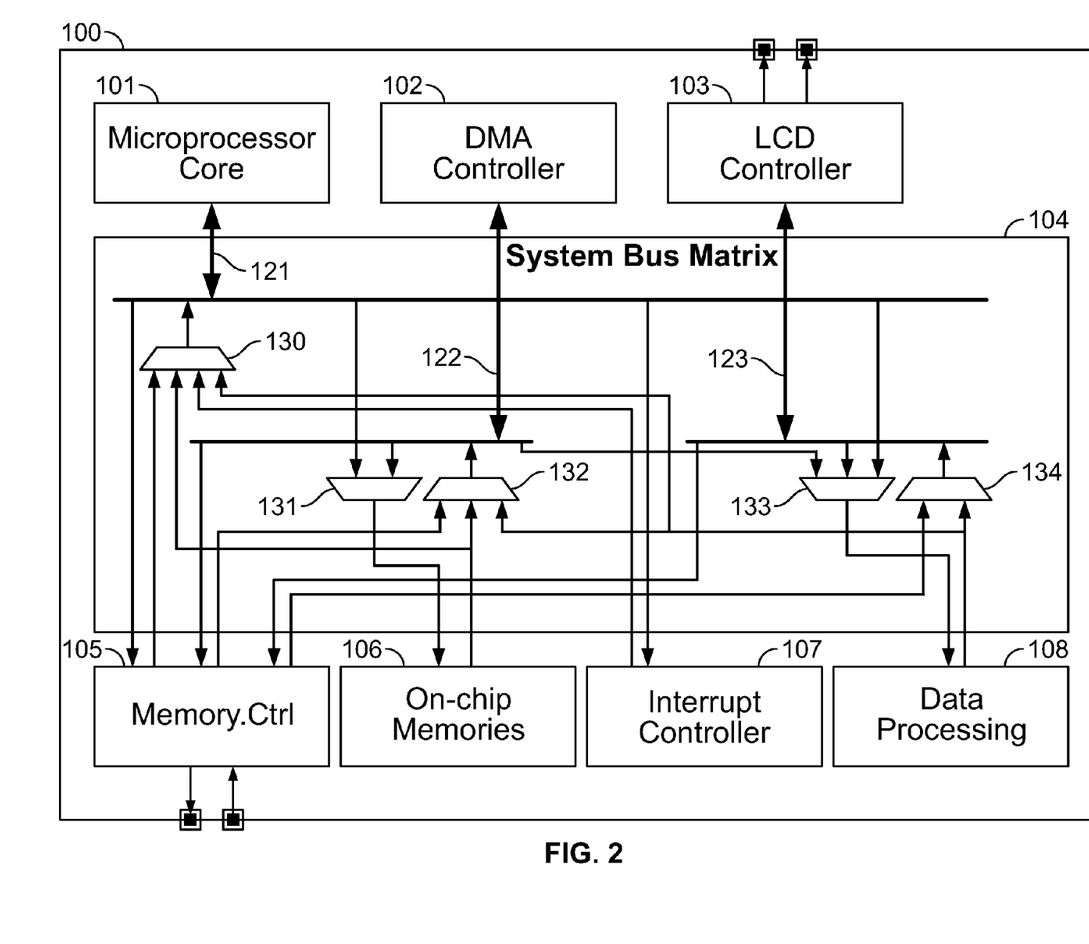
FIG. 2 is a block diagram of the example microcontroller showing an example implementation of the system bus matrix.

FIG. 2 is a block diagram of the example microcontroller 100 showing an example implementation of the system bus matrix 104. The system bus matrix 104 includes connections 121, 122, and 123 to each of the master modules 101, 102, and 103. Each connection includes, for example, a read data bus, a write data bus, an address bus, and one or more busses for control signals.

A first multiplexer 130 is coupled to the slave modules. The multiplexer 130 selects a slave module for a read access. The multiplexer 130 selects a slave module based on address bus decoding and arbitration of different requests to access a slave module.

The write data bus of the connection 121 to the microprocessor core 101 can be coupled to any of the slave modules. In this example, the microprocessor core 101 can access all of the slave modules; however, other master modules may be configured to access a subset of the slave modules. For example, the standalone DMA controller 102 is not configured to connect to the interrupt controller 107. Instead, the write data bus of the connection 122 to the DMA controller 102 can be coupled to the memory controller 105, the on-chip memories 106, and the data processing module 108. As another example, the LCD controller 103 is not configured to connect to the on-chip memories 106, which may not be large enough to hold image data for display.

A second multiplexer 131 is coupled to the slave modules. The multiplexer 131 selects a slave module for a write access. The multiplexer 131 selects a slave module based on address bus decoding and arbitration of different requests to access a slave module.

Some of the slave modules may not be connected to the multiplexer 131. For example, the memory controller 105 is not connected to the multiplexer 131. The memory controller 105 is not connected, for example, because the memory controller 105 may include several input busses (e.g., an address bus, a write data bus, a read data bus, a control signals bus) that can be connected directly to master modules.

Direct connections to master modules are useful for high latency modules. For example, suppose that the memory controller 105 is connected to an SDRAM memory device. The latency of such memory devices (e.g., DDR devices) may be six processor clock cycles, so that when the memory controller 105 performs a read access, the resulting data from the SDRAM memory device will be valid six clock cycles later. During those six clock cycles it is possible to initiate other read accesses to the memory device. Initiating read accesses while waiting for other read accesses to complete can improve the efficiency of the microcontroller compared to waiting for each read access to complete.

To handle read accesses in this manner, the memory controller 105 is configured to connect to several master modules using parallel ports. For example, the memory controller 105 may have three parallel connections to the master modules, as shown in FIG. 2. The memory controller 105 may be configured internally with a multiplexer so that the connections are multiplexed in a similar manner as the system bus matrix 104. In some implementations, instead of using arbitration to resolve parallel access requests, the memory controller 105 is configured to have a command generator that processes multiple access requests while waiting for other access requests to complete.

Data Transfers on the System Bus Matrix

Figure 3:
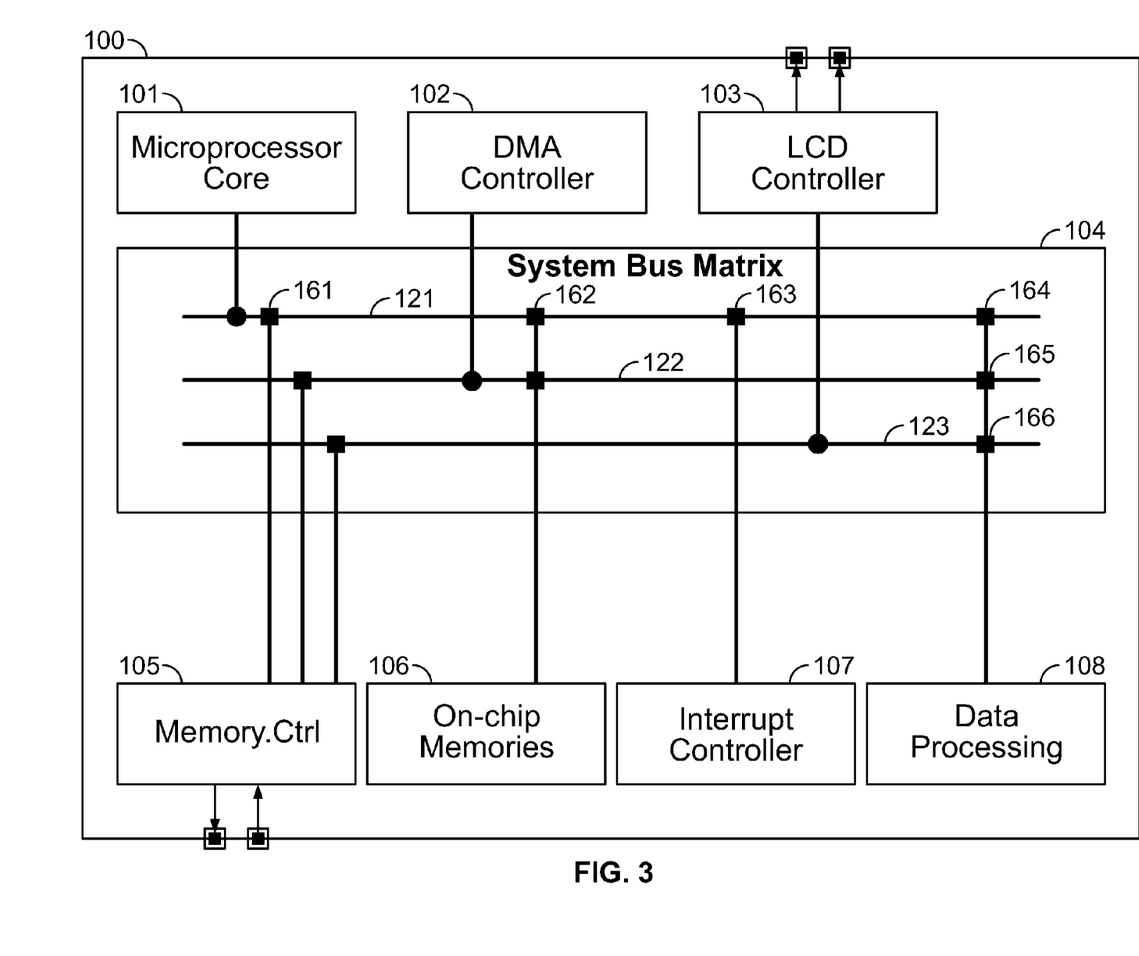
FIG. 3 is a block diagram of the example microcontroller showing the system bus matrix using a simplified schematic.

FIG. 3 is a block diagram of the example microcontroller 100 showing the system bus matrix 104 using a simplified schematic.

In FIG. 3, connections from master modules 121, 122, and 123 are shown using single lines within the system bus matrix 104. Connections between master modules and slave modules are shown using squares instead of multiplexers; however, the functionality of the squares can be implemented using the multiplexers of FIG. 2. For example, the microprocessor core 101 connects to all the slave modules 105, 106, 107, and 108, and the squares 161, 162, 163, and 164 illustrate these connections which may be implemented using multiplexers. The first multiplexer 130 of FIG. 2 corresponds to the squares 161, 162, 163, and 164 on the top line of the system bus matrix 104 in FIG. 3. The second multiplexer 133 of FIG. 2 corresponds to the squares 164, 165, and 166 on the line on the right side of the system bus matrix 104 in FIG. 3. This type of schematic is used for the remaining FIGS. of this document.

To illustrate an example use of the system bus matrix 104, consider an example transfer between the memory controller 105 and the LCD controller 103 to display an image on an LCD screen. If the LCD controller 103 includes an embedded DMA controller (not shown), then the LCD controller 103 initiates the transfer by issuing repetitive read access requests to the memory controller 105. The memory controller 105 reads data from its memory and sends the data to the LCD controller 103 using the system bus matrix 104 (e.g., using the direct connection 123 to the LCD controller 103).

While those repetitive read accesses are completing, the microcontroller core 101 or the standalone DMA controller 102 may attempt to access the memory controller 105 (e.g., because executable code for the microprocessor is stored in an external memory device, or because a DMA data buffer is stored in an external memory). Those modules 101 and 102 can initiate transfers using the memory controller 105 because the memory controller 105 is directly connected to each of those modules 101 and 102. The overall bandwidth of the external memory may be constant and thus shared between the master modules 101 and 102. Thus less bandwidth remains for correctly displaying an image which may result in, e.g., display artifacts.

To illustrate another use of the system bus matrix 104, consider an example transfer between the memory controller 105 and the LCD controller 103 to display an image where additional processing is required to display the image. The additional processing may be decryption or decompression, for example. The standalone DMA controller 102 initiates a transfer of the image data from the memory controller 105 to the data processing module 108. The data processing module 108 performs the additional processing. The standalone DMA controller 102 then initiates another transfer of the processed image data from the data processing module 108 back to the memory controller 105. The LCD controller 103, using an embedded DMA controller, can then initiate a transfer from the memory controller 105 to the LCD controller 103.

Without the additional processing, the transfer uses the system bus matrix 104 for a basic transfer bandwidth. With the additional processing, the transfer may use the system bus matrix 104 for a bandwidth of five times the bandwidth of a basic transfer. In some cases, where the additional processing increases or decreases the size of the data being transferred, the overall bandwidth will be larger or smaller than exactly five times the bandwidth of a basic transfer. The overall bandwidth is five times the bandwidth of a basic transfer because of the following transfers: a first transfer from the memory controller 105 to the standalone DMA controller 102, a second transfer from the standalone DMA controller 102 to the data processing module 108, a third transfer from the data processing module 108 to the standalone DMA controller 102, a fourth transfer from the DMA controller 102 to the memory controller 105, and a fifth transfer from the memory controller 105 to the LCD controller 103.

To illustrate another use of the system bus matrix 104, consider an example transfer where the data processing module 108 includes an embedded DMA controller and can act as a master module. The data processing module 108 initiates a transfer from the memory controller 105 to itself, and then another transfer back to the memory controller 105 of the processed data. The LCD controller 103 then initiates a transfer of the processed data to itself. This transfer may use an overall bandwidth of three times the basic transfer bandwidth.

Alternative System Bus Matrix

Figure 4:
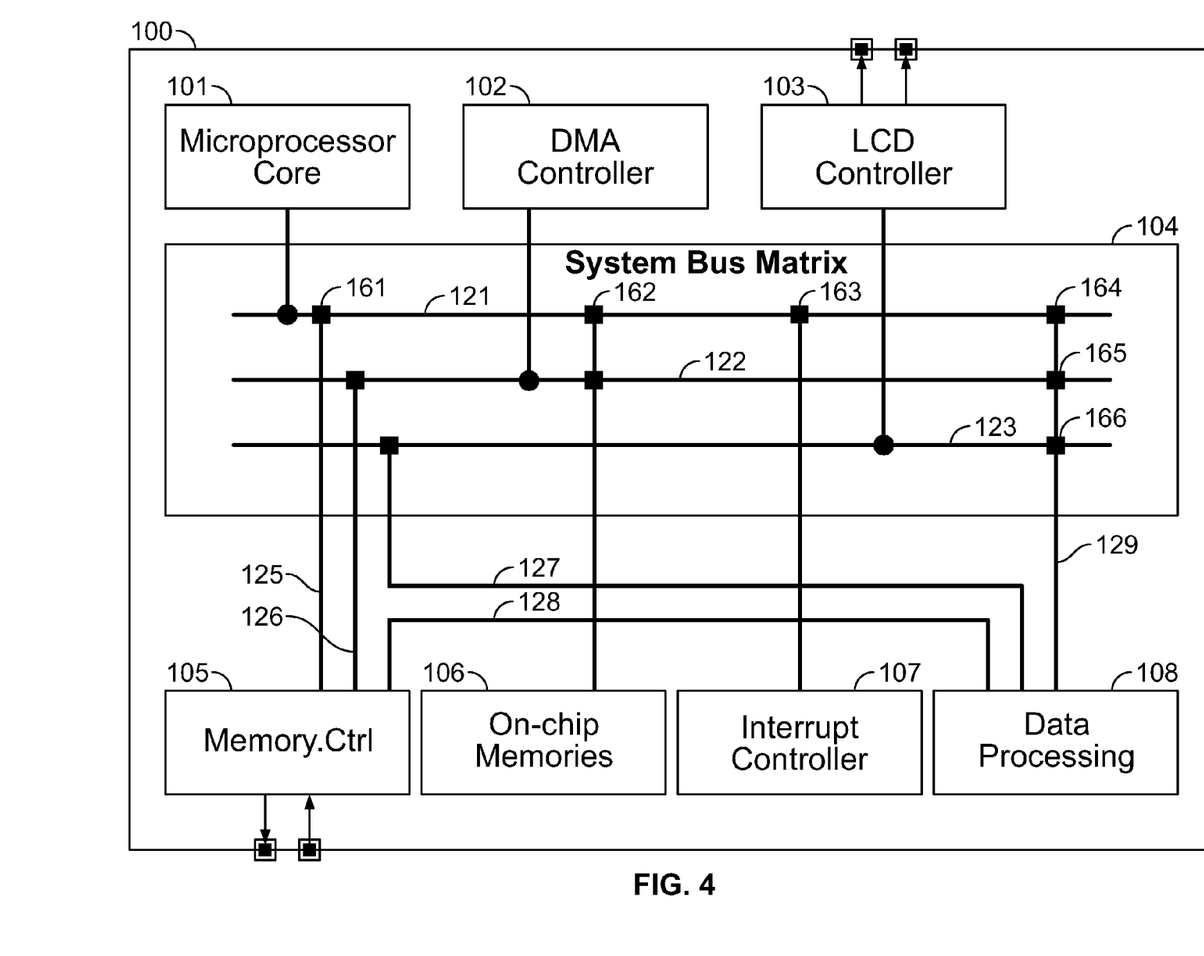
FIG. 4 is a block diagram of the example microcontroller having an alternative system bus matrix configuration.

FIG. 4 is a block diagram of the example microcontroller 100 having an alternative system bus matrix 104 configuration. The memory controller 105 is coupled to the system bus matrix 104 by two direct connections 125 and 126. The data processing module 108 is coupled to the system bus matrix 104 by a direct connection 127. The data processing module 108 is coupled to the memory controller 105 by a direct connection 128. The direct connections may include, for example, a read data bus, a write data bus, an address bus, and one or more busses for control signals.

To illustrate a use of the system bus matrix 104, consider an example transfer from external memory onto a display device using the LCD controller 103. The LCD controller 103 initiates a transfer from the memory controller 105 to the data processing module 108 by communicating with the data processing module 108 using the data processing module's direct connection 127. The data processing module 108 then initiates a read access to the memory controller 105 using the direct connection 128 between the memory controller 105 and the data processing module 108.

The memory controller 105 provides the requested data on the direct connection 128. While the data processing module 108 is processing the data, the data processing module's direct connection 127 to the system bus matrix 104 may be held in a wait state. When the data processing is complete, the processed data is transferred to the LCD controller 103 using the direction connection 127 and the connection 123 between the LCD controller 103 and the system bus matrix 104. The overall bandwidth consumed on the system bus matrix 104 during this example transfer is the basic transfer bandwidth.

During the transfer, other master modules (e.g., the microprocessor core 101 or the standalone DMA controller 102) can access the memory controller using other connections 125 and 126. The data processing module 108 is still accessible to modules on the system bus matrix 104 using the direct connection 129 to the system bus matrix 104.

Although FIG. 4 shows additional direct connections 127 and 128 coupled to the data processing module 108, similar connections can be coupled to other slaves modules. Thus, any slave module can have both a direct connection to another module and a connection to the system bus matrix 104.

Example Data Processing Module

Figure 4A:
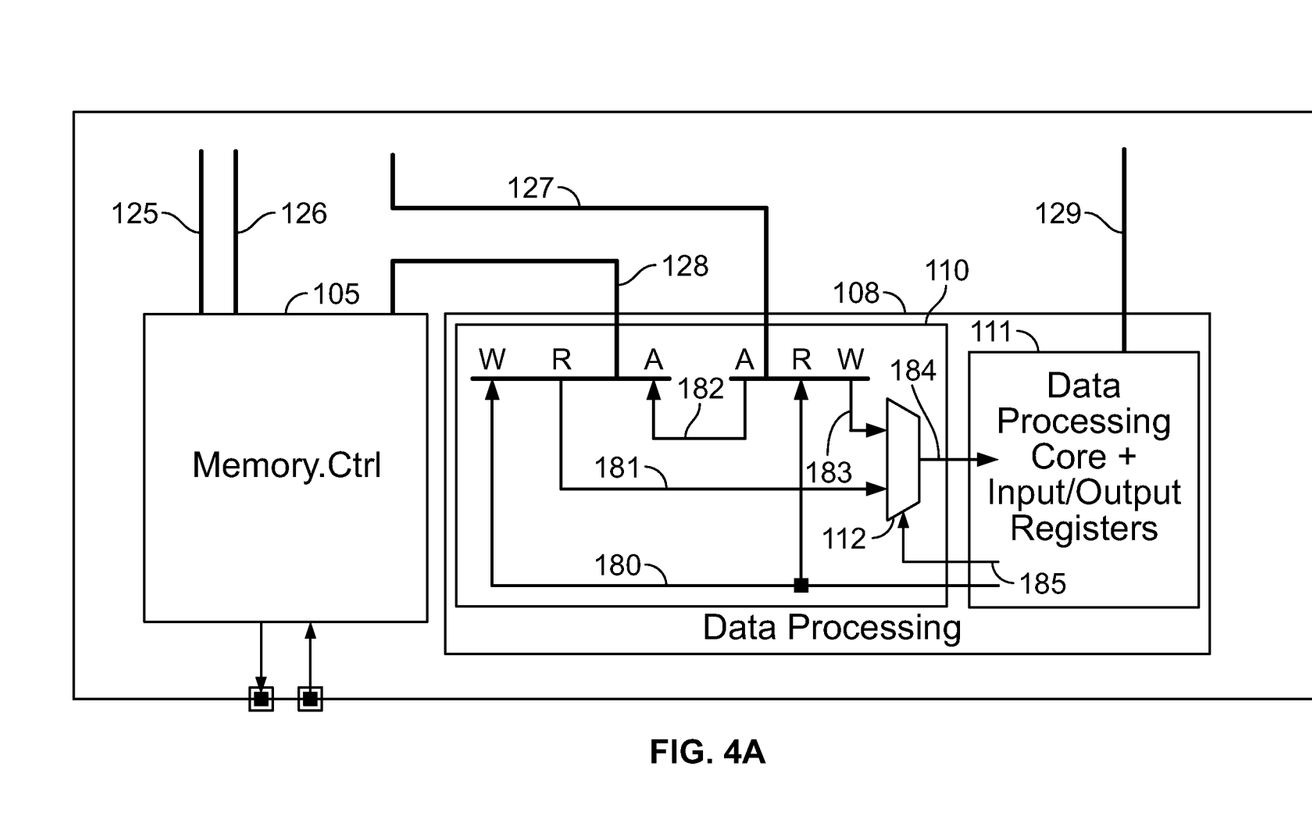
FIG. 4A is a block diagram of an example data processing module.

FIG. 4A is a block diagram of an example data processing module 108. The data processing module 108 is coupled to a direct connection 128 to the memory controller 105. The data processing module 108 is connected to the system bus matrix 104 by a connection 129 available to master modules connected through the system bus matrix 104. The data processing module 108 is also connected to the system bus matrix 104 by a direct connection 127 for the LCD controller 103 but also for any master allowed by the system bus matrix 104 to connect to the data processing module 108 using the direct connection 127. To implement these connections, additional logic may be included within the microcontroller 100, e.g., within the memory controller 105 or the data processing module 108. FIG. 4A shows additional logic in the data processing module 108 as an example.

The data processing module 108 includes a core module 111 that includes the data processing core and input/output registers. The core module 111 may include configuration registers. The configuration registers can be used to specify, e.g., whether the core module 111 is performing encryption or decryption.

The data processing module 108 may receive data from any of three sources: a connection 129 to the system bus matrix 104, a connection 128 to the memory controller 105, and a connection 127 to the system bus matrix 104 for the LCD controller 103. The core module 111 may receive configuration data on the connection 129 from the system bus matrix. The core module also receives data on an internal connection 184 to a sub-module 110. The sub-module 110 selects connections to send and receive data for the core module 111. The core module writes data to another internal connection 180 to the sub-module 110.

The sub-module 110 includes additional logic to select either the connection 128 to the memory controller 105 or the connection 127 to the system bus matrix 104 for the LCD controller 103. A multiplexer 112 is configured by a connection 185 driven by the core module 111. The multiplexer 112 is configured to select either a read access bus 181 coupled to the connection 128 to the memory controller or a write access bus 183 coupled to the connection 127 to the system bus matrix 104. The sub-module 110 also couples an address bus included with the connection 127 to the system bus matrix 104 to an address bus included with the connection 128 to the memory controller 105 using an address bus connection 182. Because of the address bus connection 182, the data processing module 108 can be configured so that it only needs to process data from the internal connections 108 and 184.

To illustrate use of the example data processing module 108, consider an example transfer where a master module issues a write access command from the system bus matrix 104 using the direct connection 127. The write access command is an instruction to process data and store the data in external memory using the memory controller 105. The multiplexer 112 selects the appropriate internal connection 183 to provide the data to the core module 111. The core module 111 processes the data and provides the processed data to the memory controller 105 using the internal connection 180 to the sub-module and the direct connection 128 to the memory controller 105.

A control signal may be generated (e.g., by the data processing module 108) to instruct the memory controller 105 to assume a wait state while the data is being processed. The control signal can be sent to the memory controller 105 using a control signal bus of the direct connection 128 to the memory controller 105. For example, if the direct connection 128 is managed using the Advanced Microcontroller Bus Architecture (AMBA) High-performance Bus (AHB) protocol, the control signal may be implemented with a "BUSY" command type.

To illustrate a use of the example data processing module 108, consider another example where a master module initiates a read access using the direct connection 127 from the system bus matrix 104. The read access requests data to be read from the memory controller 105 and processed by the data processing module 108. The data processing module 108 initiates a read access on the direction connection 128 to the memory controller 105. The memory controller 105 returns the requested data on the direct connection 128, and the sub-module 110 routes the requested data to the core module 111 using the internal connection 181 to the multiplexer output 184. The data processing module 108 processes the data and provides the processed data to the requesting module using the internal connection 180 to the read data bus of the direct connection 127 to the system bus matrix 104.

A control signal is generated (e.g., by the data processing module 108) to instruct the requesting master module to assume a wait state while the data is being returned from the memory controller 105 and processed. The control signal can be sent to the requesting master module using a control signal bus of the direct connection 127 to the system bus matrix 104. For example, if the direct connection 128 is managed using the AHB protocol, the control signal may be implemented with an "HREADY" command type.

Alternative Microcontroller Including a Bus Multiplexer

Figure 5:
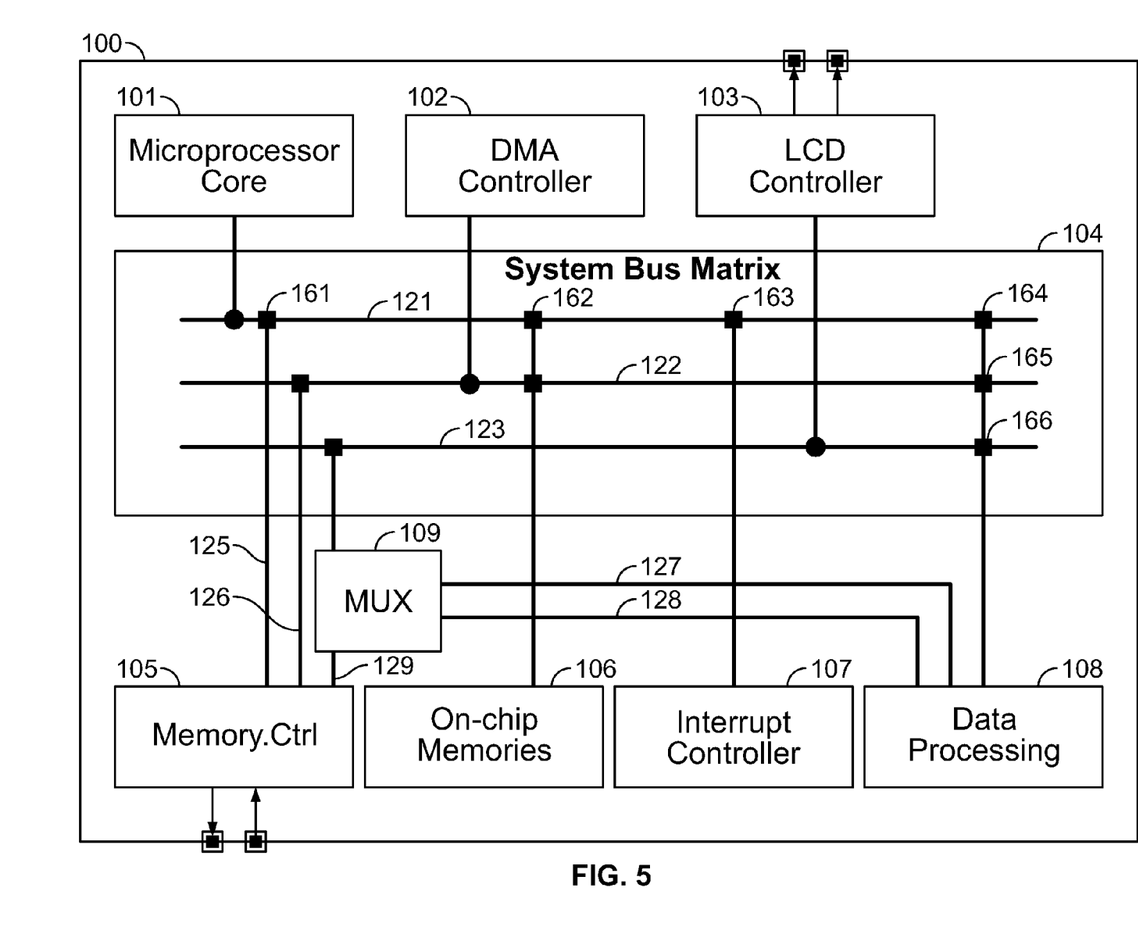
FIG. 5 is a block diagram of the example microcontroller including an optional bus multiplexer module.

FIG. 5 is a block diagram of the example microcontroller 100 including an optional bus multiplexer module 109. When a write access is initiated on a first connection 123 of the system bus matrix 104, the bus multiplexer module 109 is configured to select either the system bus matrix 104 on the first connection 123 or the direct connection 128 from the data processing module 108. The bus multiplexer module 109 connects the selected connection 129 to an input bus of the memory controller 105. When a read access is initiated on the first connection 123 of the system bus matrix 104, the bus multiplexer module 109 is configured to select either the direct connection 127 or a port 129 of the memory controller 105. The bus multiplexer module 109 connects the selected connection to the first connection 123 of the system bus matrix 104. The bus multiplexer module 109 behavior may be configured, for example, by a user configurable register.

Example Bus Multiplexer Module

Figure 5A:
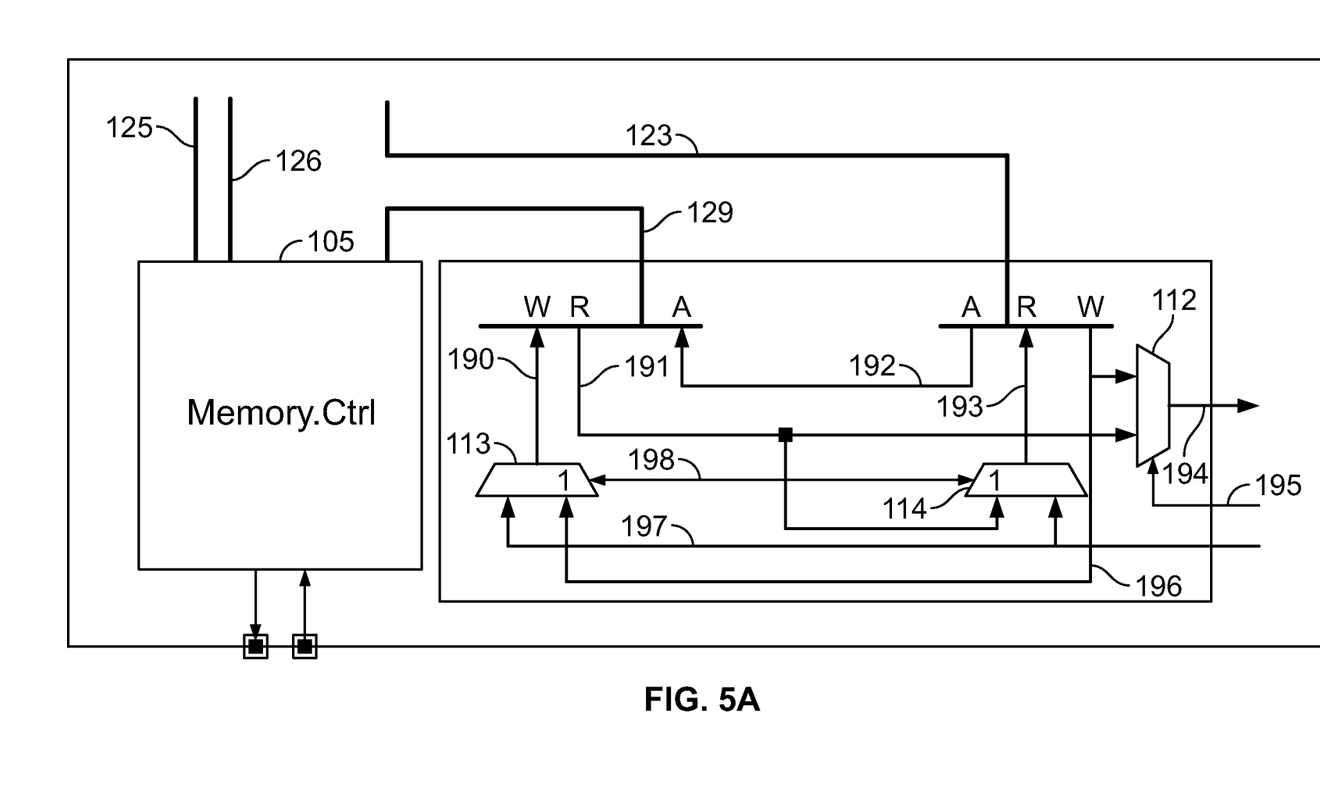
FIG. 5A is a block diagram of an example bus multiplexer module.

FIG. 5A is a block diagram of an example bus multiplexer module 109. The bus multiplexer module 109 includes multiplexers 113 and 114 that, in some configurations, directly connect the system bus connection 123 to the direct connection 129 to the memory controller 105. A read data bus 193 of the system bus connection 123 may be directly connected to a read data bus 191 of the direct connection 129 to the memory controller 105. The multiplexers 113 and 114 can be configured by the same signal on a configuration connection 198. The configuration connection 198 may be coupled to a configuration register, for example, included in a module that is accessible through a software interface.

Extended Bus Multiplexer Module

Figure 6:
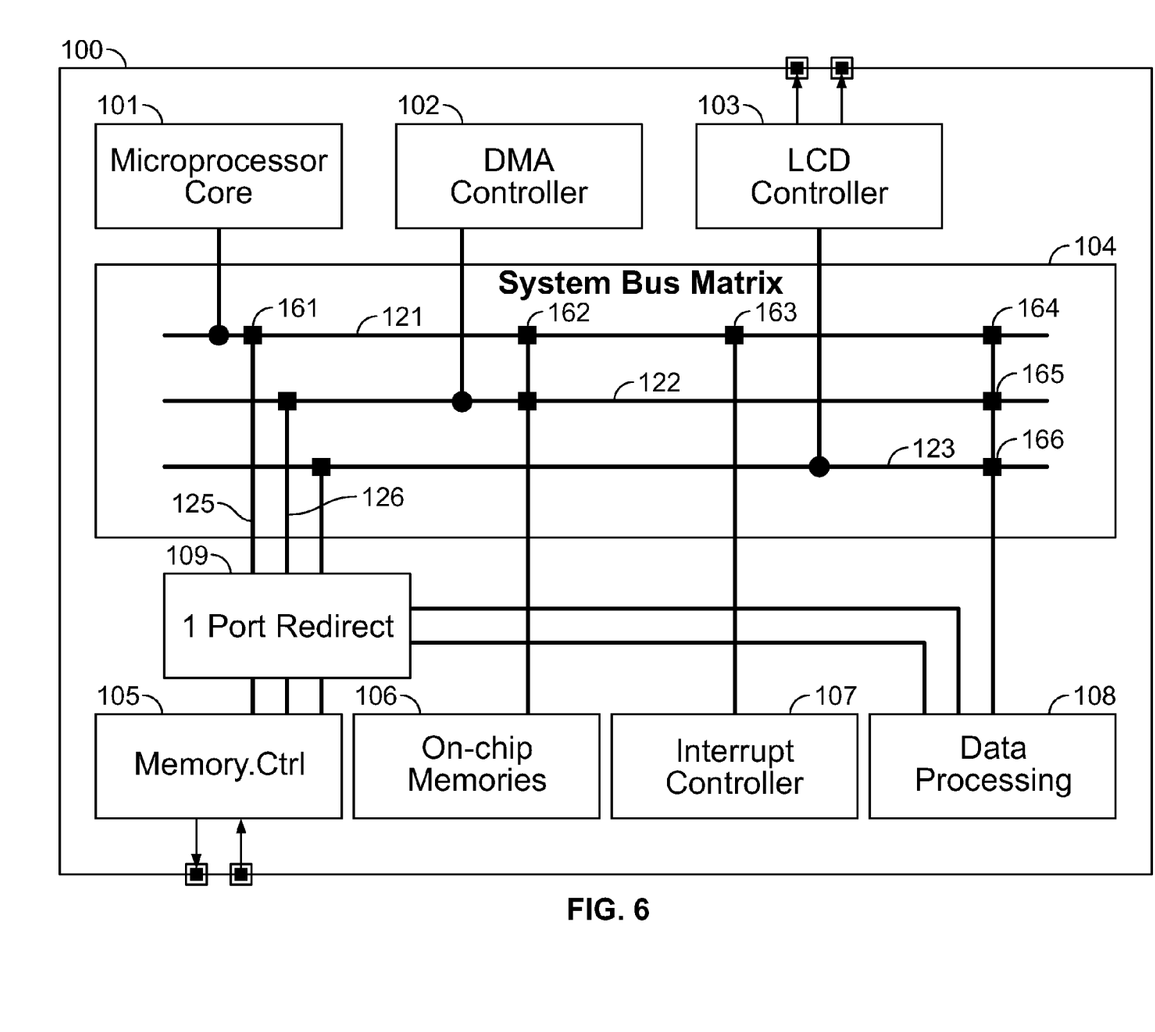
FIG. 6 is a block diagram of the microcontroller including an extended bus multiplexer module.

FIG. 6 is a block diagram of the microcontroller 100 including an extended bus multiplexer module 109. The bus multiplexer module 109 is labeled as a "one port redirect" because, in this configuration, it can select any of the connections to the memory controller 105. Thus, other connections to the memory controller 105 (e.g., connections 125 and 126) may be routed to additional modules (e.g., different data processing modules) while some connections remain coupled to the system bus matrix 104.

Bus Multiplexer Module for the LCD Controller

Figure 7:
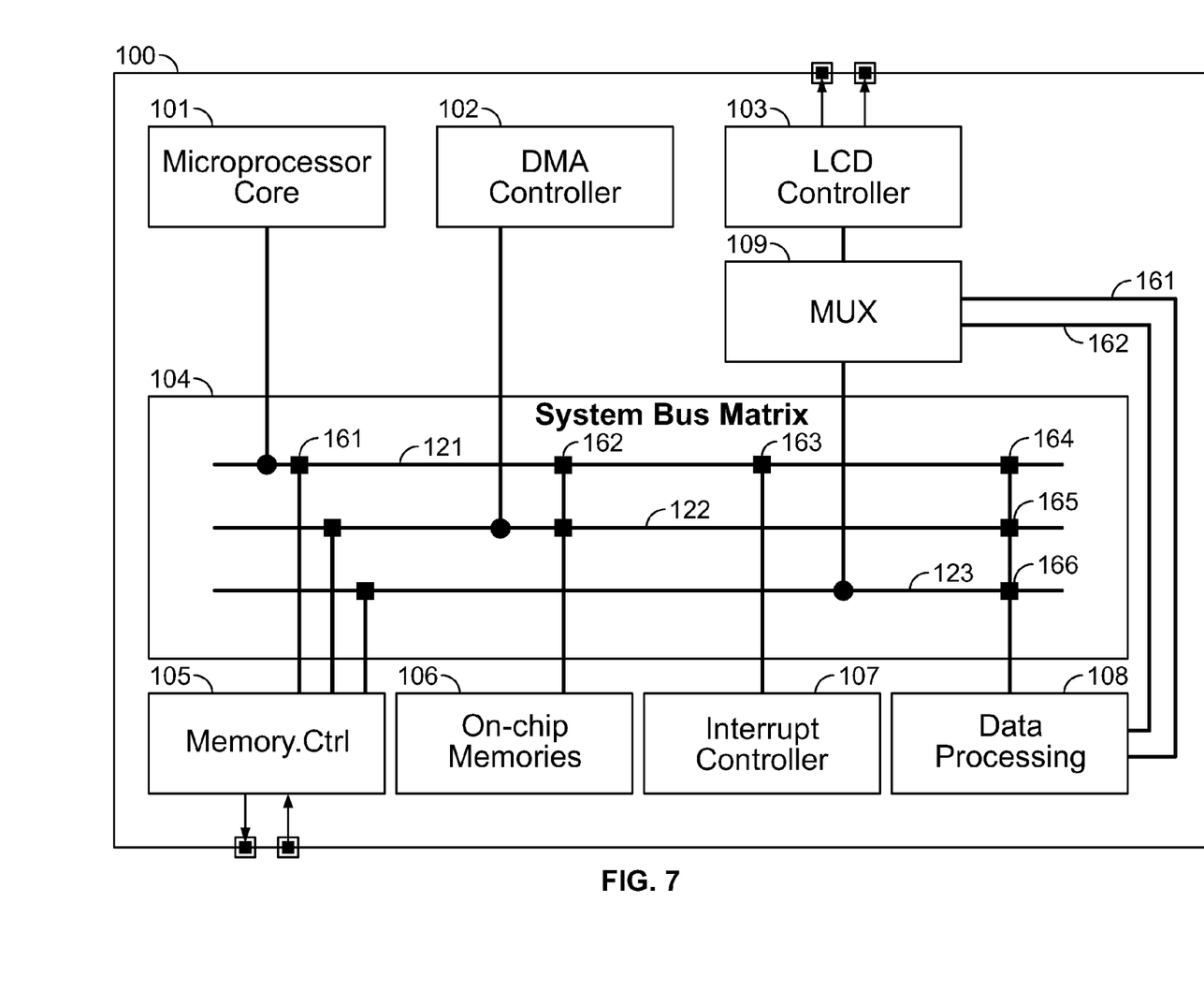
FIG. 7 is a block diagram of the microcontroller where the bus multiplexer module is configured to provide flexibility for connections to the LCD controller.

FIG. 7 is a block diagram of the microcontroller 100 where the bus multiplexer module 109 is configured to provide flexibility for connections to the LCD controller 103. The bus multiplexer module 109 can be configured, for example, using a configurable register. The configurable register may be included in any module connected on the bus, e.g., the LCD controller module 103.

In this configuration, the resulting bandwidth requirement for a transfer from the memory controller 105 to the LCD controller 103 is the same as it was for the architectures of FIGS. 4, 5, and 6. However, the LCD controller 103 (or any master module similarly configured) can now redirect a transfer to a slave module accessible to the LCD controller 103 using the system bus matrix 104.

Extended Bus Multiplexer Module for Master Modules

Figure 8:
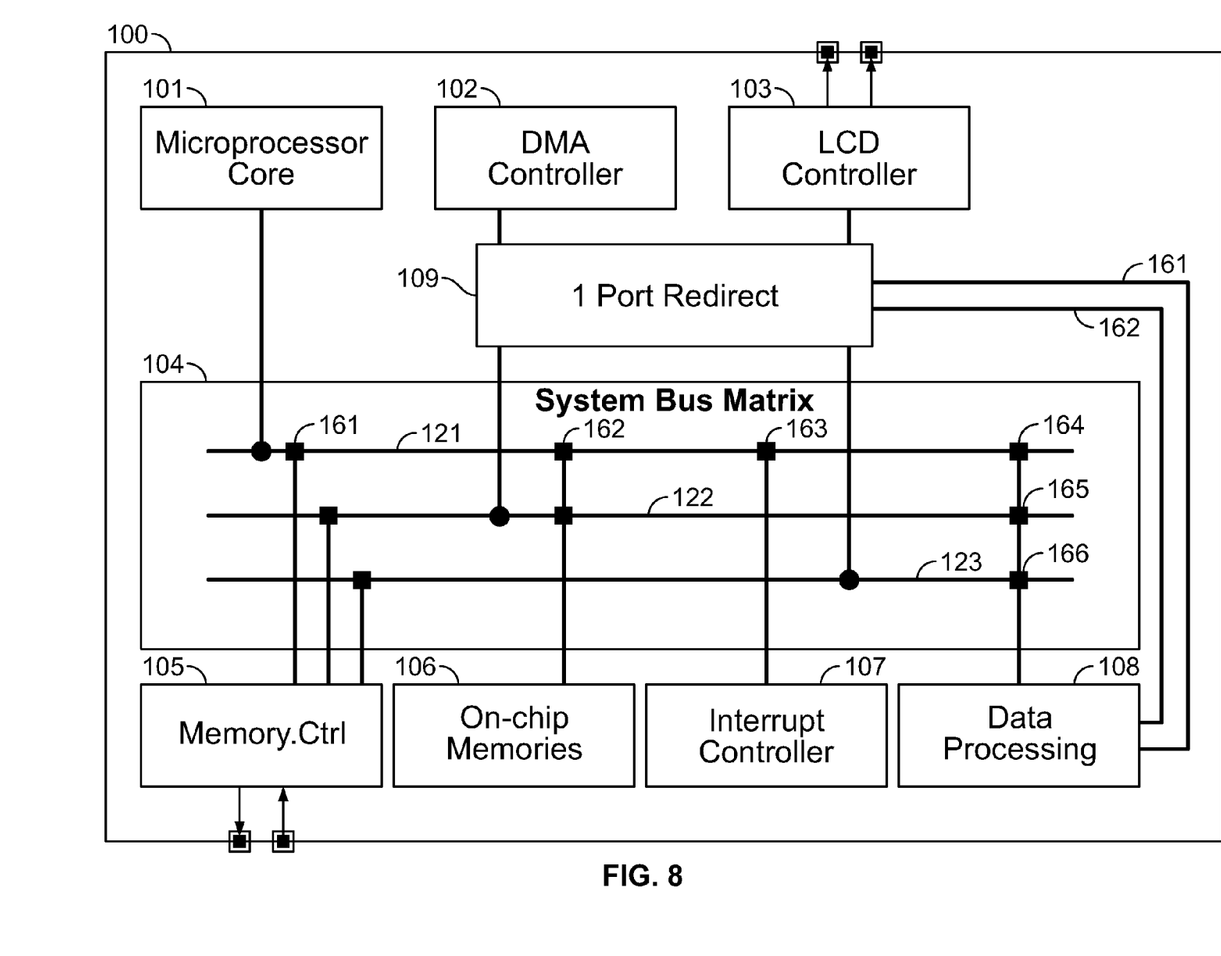
FIG. 8 is a block diagram of the microcontroller where the bus multiplexer module is extended to the standalone DMA controller.

FIG. 8 is a block diagram of the microcontroller 100 where the bus multiplexer module 109 is extended to the standalone DMA controller 102. In this configuration, either the LCD controller 103 or the standalone DMA controller 102 can redirect transfers to slave modules (e.g., the data processing module 108).

Example Memory Controller Including a Queue

Figure 9:
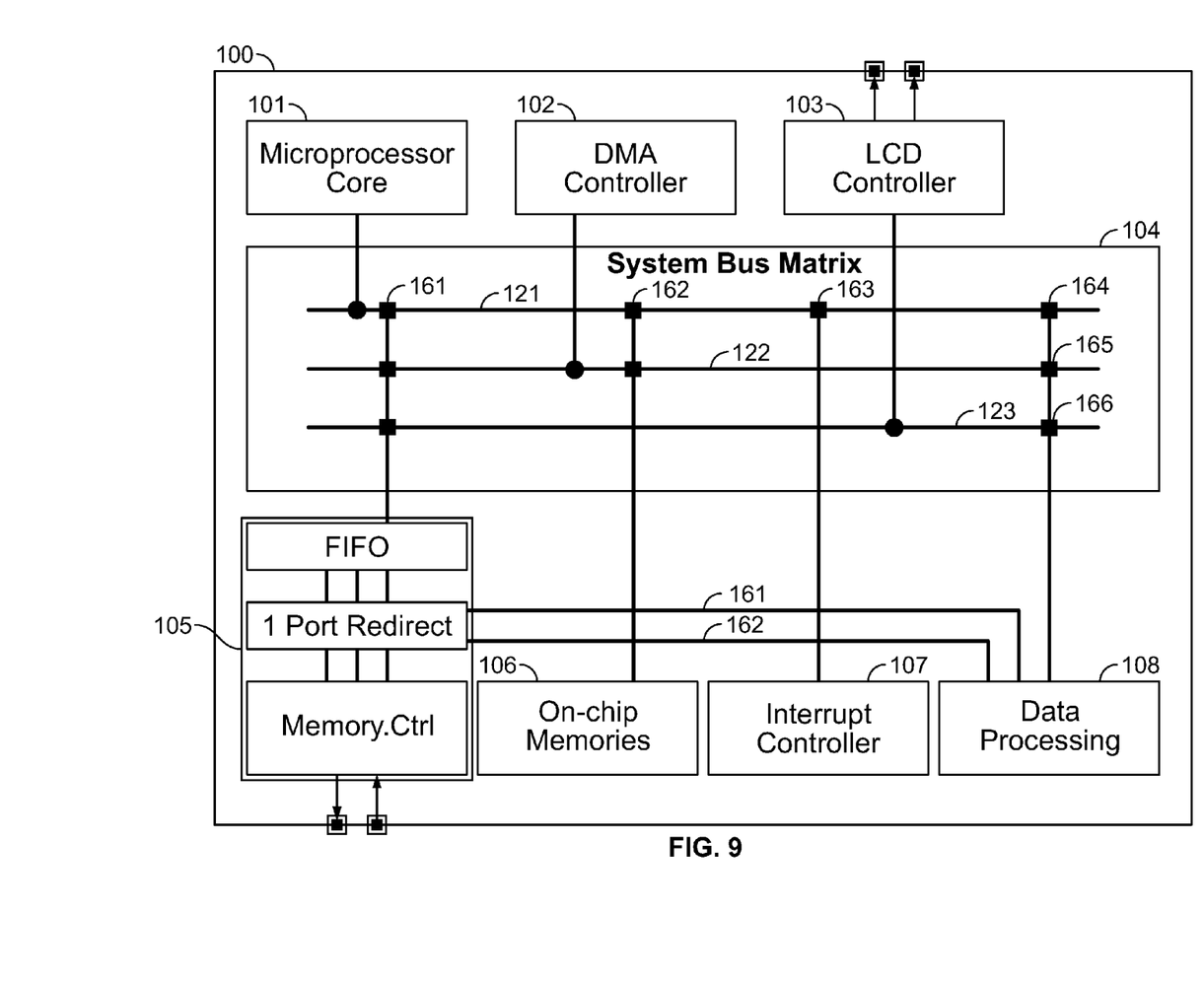
FIG. 9 is a block diagram of the microcontroller where the memory controller includes a queue, e.g., registers configured to store data as a first in/first out queue.

FIG. 9 is a block diagram of the microcontroller 100 where the memory controller 105 includes a queue, e.g., registers configured to store consecutive access information or data. The registers store read access requests that the memory controller 105 processes, e.g., in the order they are received. It is useful to store multiple read access requests so that different transfers can be parallelized and optimized in view of the latency of accessing external memory. Thus the memory controller 105 includes an arbitration and command generator engine to determine which read access requests (e.g., of multiple read access requests received in parallel) should be handled first or what kind of access command can be passed to the memory device during the read latency generated for the current read access. The queue is useful, for example, for microcontrollers using the Advanced eXtensible Interface (AXI) bus protocol.

Example Process for Transferring Data

Figure 10:
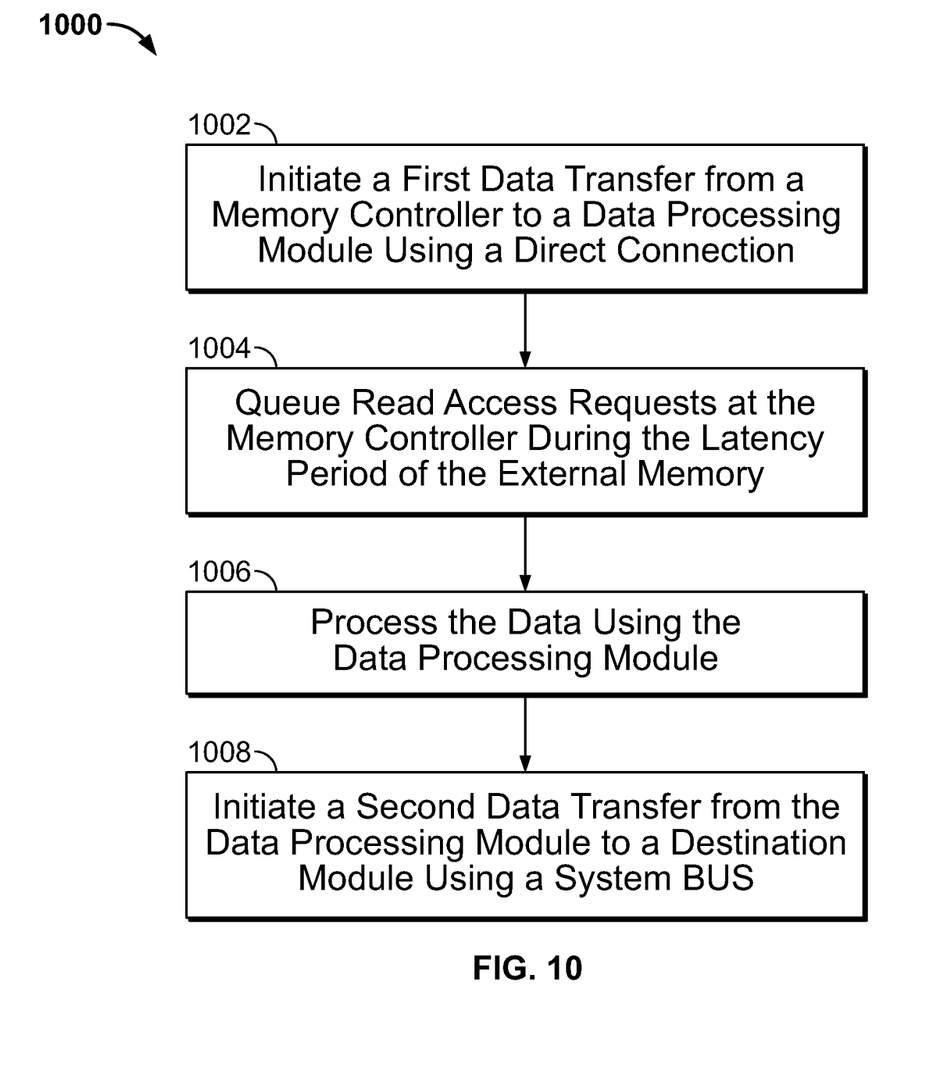
FIG. 10 is a flow diagram of an example process for transferring data between a memory controller and a destination module.

FIG. 10 is a flow diagram of an example process 1000 for transferring data between a memory controller and a destination module. The data is processed between the memory controller and the destination module. The memory controller and destination module may be included in a microcontroller that performs the process 1000. For example, the microcontroller may be the microcontroller 100 of FIG. 4, or configured as described with reference to any of the figures of this document. For purposes of illustration, the process 1000 will be described with respect to a microcontroller that performs the process 1000.

The microcontroller initiates a first data transfer from the memory controller to a data processing module using a direct connection between the data processing module and the memory controller (step 1002). For example, the destination module may include an embedded DMA controller that initiates the first data transfer. The destination module initiates the transfer using its embedded DMA controller and a system bus. The data processing module then begins transferring the data from the memory controller to itself using the direct connection. The data processing module may include another embedded DMA controller to perform the transfer.

During the transfer from the memory controller to the data processing module, the memory controller continues to receive read access request (step 1004). For example, the memory controller may receive and queue read access requests on parallel inputs connected to the system bus. By queuing and parallelizing read access requests, the memory controller can optimize accesses to its external memory based on the external memory's latency.

The microcontroller processes the data using the data processing module (step 1006). For example, if the data is encrypted image data and the destination module is a display controller, the data processing module may decrypt the image data for the display controller.

The microcontroller initiates a second data transfer of the processed data from the data processing module to the destination module using the system bus (step 1008). For example, the destination module may use its embedded DMA controller to transfer the processed data to itself.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

What is claimed is:

1. A microcontroller device comprising:
a processor, a plurality of modules, a system bus, and a direct connection, wherein:
the system bus is coupled to the processor and the modules;
the direct connection is coupled to a first module of the modules and a second module of the modules; and
the first module is configured to initiate a data transfer between the second module and the first module using the direct connection, to perform data processing on data received from the second module resulting in processed data, and to output the processed data to a third module of the modules, in response to receiving a request from the third module on the system bus.

2. The device of claim 1, wherein the first module is configured to perform decryption of data received resulting in decrypted data and output the decrypted data to the third module.

3. The device of claim 1, wherein the first module is a data processing module.

4. The device of claim 1, wherein the third module is a display controller, and wherein the data transfers include transfers of image data.

5. The device of claim 1, wherein the third module includes an embedded Direct Memory Access (DMA) controller.

6. The device of claim 1, wherein the modules comprise one or more master modules and one or more slave modules, and wherein the system bus comprises a plurality of multiplexers configured to select connections between modules according to a plurality of signals from a master module initiating a data transfer.

7. The device of claim 1, further comprising a bus multiplexer module coupled to the second module, the direct connection to the first module, and the system bus, wherein the bus multiplexer module is configured to select between the system bus and the direct connection for the second module.

8. The device of claim 1, further comprising a bus multiplexer module coupled to the third module, the system bus, and the direct connection, wherein the bus multiplexer module is configured to select between the system bus and the direct connection for the third module.

9. The device of claim 1, wherein the second module is a memory controller.

10. The device of claim 9, wherein the memory controller is configured to receive read access commands on a plurality of inputs and process the read access commands in parallel.

11. The device of claim 9, wherein the memory controller comprises a queue for storing read access commands.

12. The device of claim 9, wherein the memory controller is coupled to an external memory having a latency greater than a clock cycle of the processor.

13. A method comprising:
initiating, using a first embedded direct memory access (DMA) module of a destination module, a first data transfer of data from a memory controller to a data processing module using a direct connection coupled to the memory controller and the data processing module;
processing the data using the data processing module to result in processed data; and
initiating a second data transfer of the processed data from the data processing module to the destination module using a system bus coupled to the data processing module, the memory controller, and the destination module.

14. The method of claim 13, wherein the data is image data, processing the data includes decrypting the image data, and the destination module is a display controller module.

15. The method of claim 13, further comprising queuing read access requests at the memory controller.

16. The method of claim 13, wherein the memory controller is configured to receive read access commands on a plurality of inputs and process the read access commands in parallel.

17. The method of claim 13, wherein the destination module is a master module on the system bus and the memory controller module is a slave module on the system bus.

18. The method of claim 13, wherein initiating the first data transfer comprises configuring a plurality of multiplexers of the system bus by writing values to a plurality of configuration registers coupled to the multiplexers.

* * * * *